Patented May 14, 1935

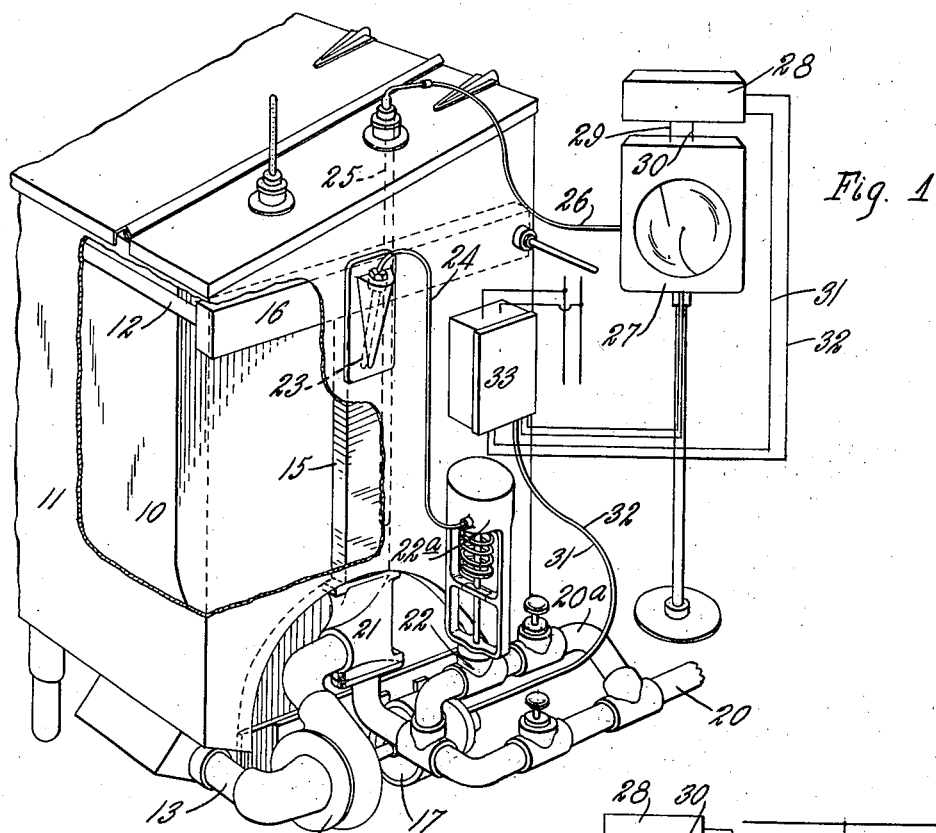
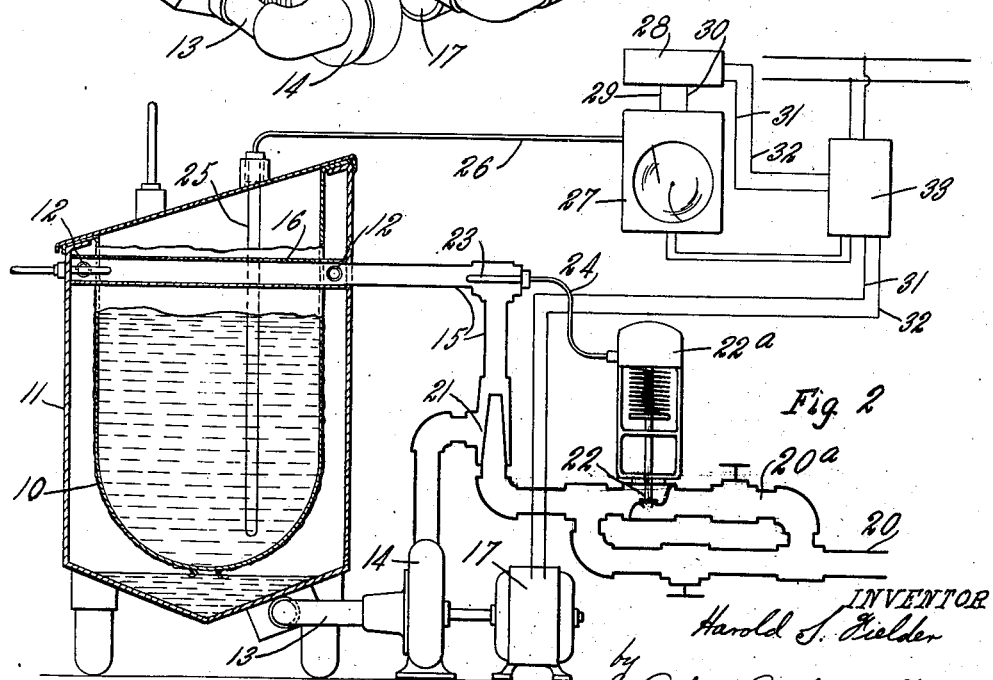

2,001,344

UNITED STATES PATENT OFFICE 2,001,344

TEMPERATURE CONTROL MEANS FOR LIQUID HEATERS

Harold S. Fielder, La Grange, Ill., assignor to Cherry-Burrell Corporation, Wilmington, Del., a corporation of Delaware Application June 29, 1933, Serial No. 678,255

19 Claims. (Cl. 236—18)

This invention relates to means for controlling temperatures in liquid heaters or pasteurizers, and more particularly to automatic temperature control means for vat or batch pasteurizers of that type in which a body of milk in a container is heated to and held for a period of time at a suitable pasteurizing temperature by circulating a heating medium in heat exchange relation to the milk in the vat. A well known example of such pasteurizers is the spray vat in which the milk is heated by water flowing in external contact with the vat.

In this specification, for the sake of clarity and brevity of description, the liquid to be heated or pasteurized is referred to as "milk", and the heating medium as "water", but it is to be understood that it is not thereby intended to restrict the invention to milk heaters or pasteurizers.

In the spray vat pasteurizer, the body of milk in the vat is heated by hot water sprayed or discharged externally on a heat conducting wall or walls of the vat. The water, after flowing over the outer surface of the vat, is withdrawn from the insulating jacket of the vat and is again discharged against the vat, the water being recirculated by a suitable pump or circulating device and used repeatedly. Ordinarily, the water is heated by means of steam discharged into the circulating body of water. Temperature control means embodying this invention are also applicable to other vat or batch heaters or pasteurizers in which the water or other suitable heating medium is applied in other ways for heating the milk.

Proper pasteurization of the milk requires the milk to be heated to a prescribed temperature and held at that temperature for a prescribed period of time, say, for example, thirty minutes, where a pasteurizing temperature of 145° F. is adopted. In order to efficiently heat the milk to this temperature by means of water as the heating medium, it is customary to use water of higher temperature, for instance, about 160° F. and the best efficiency and the most reliable results are insured by maintaining both the volume and the temperature of the water substantially constant. After the milk has been heated to pasteurizing temperature, it should be maintained uniformly at this temperature and prevented from either rising above or falling below such temperature throughout the holding period.

One object of my invention is to provide a novel and reliable automatic temperature control means which will insure these results.

Other objects of the invention are to provide means which operate automatically under the combined control of both the milk and the water temperatures for heating the milk, and which will maintain a substantially constant volume of circulating water of suitably regulated temperature during the heating of the milk to the pasteurizing temperature and will maintain the milk uniformly at the pasteurizing temperature during the holding period; also to provide automatic means, controlled by the temperature of the water, which regulates the water temperature as required, and coordinated means controlled by the temperature of the milk, which stops the water circulating means and causes the water-heating steam or medium to be shut off when the milk reaches the prescribed pasteurizing temperature, and then operates during the holding period to start and stop the circulation and heating of the water, as required, to maintain the milk at said pasteurizing temperature throughout the holding period; also to provide pasteurizing apparatus in which a substantially constant volume of water heated by steam is positively circulated for heating the milk to pasteurizing temperature, and the admission of steam to the water is regulated to bring the water to and maintain it at the required temperature until the pasteurizing temperature of the milk is reached, when the circulation of the water is stopped and the steam is shut off, and then, if the temperature of the milk falls during the holding period, the circulation and heating of the water are again started and stopped, as may be necessary, to hold the milk at the prescribed pasteurizing temperature; and also to provide temperature control means for liquid pasteurizers which has other features of improvement and advantage hereinafter described and set forth in the claims.

In the accompanying drawing:

Fig. 1 is a fragmentary perspective view of a spray vat pasteurizer provided with temperature control means embodying the invention and adapted to carry out my improved method.

Fig. 2 is a view thereof showing the vat in transverse section and diagrammatically illustrating the water circulating and temperature control means.

Referring to the spray vat construction illustrated in the drawing, the pasteurizer vat has a lining 10, made of suitable heat-conducting metal, which forms the receptacle for the body of milk, and a suitable outer insulating jacket 11. The milk in the vat 10 is heated by hot water discharged against the outer surfaces of the side walls of the lining 10 from spray pipes 12 located within the jacket 11, lengthwise along the upper portions of the sides of the lining 10. Water discharged from these pipes flows in films down the walls of the lining 10 and falls into the bottom of the jacket 11, from which the water is withdrawn through a pipe 13 by a suitable water circulating pump 14 which returns the water through a main discharge conduit 15 and branches 16 to the spray pipes 12. The pump thus acts to withdraw the water from the bottom of the jacket and deliver it to the spray pipes by which it is discharged against the vat lining to flow down externally over the walls thereof so that the water is recirculated and repeatedly used. This, in brief, describes a well known construction of spray vat pasteurizer, and while preferably, the vat lining or milk receptacle proper is of the usual elongated rectangular shape in plan and of substantially the cross sectional shape shown in Fig. 2, the pasteurizer may be of other suitable construction in which a body of milk in a container is heated by water or other heating medium which flows in external contact with the heat conducting wall or walls of the vat or in other suitable heat exchange relation to the liquid in the vat. Certain additional advantages are realized, as will hereinafter appear, by the use of a construction in which said heat exchange relation is interrupted so that further substantial exchange of heat between the heating medium and the milk will be arrested when the flow of the heating medium is stopped.

The water circulating pump 14 is preferably driven by an electric motor 17. The pump positively circulates the water, and by driving it at a constant speed, the volume of the water circulated is maintained substantially constant. The circulating water is heated to a suitable temperature to impart the required maximum or pasteurizing temperature to the milk, preferably by injecting live steam into the water and regulating the supply of the steam to control the temperature imparted by it to the water.

20 represents the steam supply pipe leading to a suitable steam jet or fitting 21 for introducing the steam into the main water pipe 15, and 22 is an automatic temperature controlled regulating valve for regulating the admission of steam from the supply pipe into the water and turning the steam on and off. This regulating valve 22 is preferably provided in a bypass branch 20a of the steam supply pipe, so that by the provision of the usual hand valves in the main and bypass pipes, the steam supply can be turned on and off or controlled by hand when desirable. The automatic valve 22 operates to increase or decrease the admission of steam to the water, or to turn on and shut off the steam, under the control of means responsive to temperature changes in the water or heating medium. The means illustrated for this purpose comprises a thermosensitive bulb or element 23 preferably located in the main water discharge conduit 15 and connected by a tube 24 to the actuating bellows or element 22a of the regulating valve 22 so that the bellows or element is operated by the expansion and contraction or pressure changes in the fluid in the bulb 23 and tube 24 to more or less, or completely open and close the steam supply valve 22 responsive to fluctuations in the temperature to which the bulb 23 in the water circulating conduit or system is subjected. This steam supply or regulating valve and its control means may be of any known or suitable construction adapted to be set or adjusted to control the supply of steam to the water so as to regulate the water temperature as required to raise the milk to the desired predetermined temperature and prevent the heating of the water above a suitable maximum temperature, say 160° F. Preferably, the control operates to bring the water to and maintain it substantially at this temperature during the heating of the milk.

In addition to this means for controlling the temperature of the water, temperature control means for the milk, responsive to fluctuations in temperature of the milk are also employed. Such means may comprise a thermo-sensitive bulb or element 25 which is arranged to extend into the milk in the vat or is otherwise located so as to respond to fluctuations in the temperature of the milk, and is connected by a tube 26 with a control device, indicated diagrammatically at 27, of any suitable construction, adapted to be actuated by the expansion and contraction or changes of pressure of the fluid in the bulb 25 and the tube 26, and to operate through suitable means, such as a mercoid electrical switch of known construction, indicated at 28, which is electrically connected as by conductors 29 and 30 with the control device 27, and as by conductors 31, 32 and an interposed manual switch in box 33, with the electric motor 17 which drives the water circulating pump. This control means is adapted to be set so as to operate the switch 28 to turn off the current and stop the motor and, therefore, stop the pump and circulation of the water when the milk reaches the desired pasteurizing temperature, for instance, 145° F. The stopping of the water circulation causes the automatic valve 22 to shut off the steam in the following manner: By locating the bulb 23, as shown, in the water supply conduit 15 above the pump, the water will fall away from or out of contact with the bulb when the pump is stopped and thus subject the bulb to the steam temperature. The bulb will then respond quickly to this increased temperature and operate to cause the regulating valve 22 to close promptly and shut off the steam, thereby preventing over heating of the milk.

Thus, the temperature control means for the water operates to cause the water, which is circulated in substantially constant volume, to be heated to the predetermined maximum temperature required to heat the milk, and then maintain this water temperature substantially constant until the pasteurizing temperature of the milk is reached, whereupon the control means, including the bulb 25 in the milk, operates to stop the circulation of the water and also to cause the steam to be shut off. This prevents the milk from being heated above the prescribed temperature.

In addition to thus controlling the temperature of and stopping the water circulation and shutting off the steam when the milk reaches the pasteurizing temperature, the described control means also function to maintain the desired milk temperature substantially uniform throughout the required holding period, which is approximately thirty minutes when 145° F. is the maximum milk temperature. This is accomplished as follows: If, after the milk has been heated to the prescribed temperature and the pump and circulation of the water have been stopped, as explained, the milk temperature should drop, say one-fourth degree, then the means controlled by the milk bulb 25 will operate to close the switch 7

28 and thereby start the pump to again circulate the water. The temperature of the water at this time will be somewhat lowered, and this reduced temperature acting on the water bulb 23 operates to open the steam regulating valve 22, and admit steam to the circulating water, thereby raising the temperature of the water and promptly restoring the prescribed milk temperature. Thereupon the milk bulb 25 will again operate through the control device 27 and switch 28, as before, to stop the pump and the circulation of the water. When the pump stops, the water will fall away from the bulb 23 as explained, and the steam will quickly raise the temperature in the main conduit 15 in which the water bulb 23 is located, and thereby cause the steam regulating valve 22 to promptly close and shut off the supply of steam to the water. The circulation of the water is thus started and stopped and the steam turned on and off with slight fluctuations in the temperature of the milk during the holding period so as to maintain the temperature of the milk substantially constant throughout the holding period. The control is sensitive and efficient and will maintain the milk within a fraction of a degree of the required pasteurizing temperature during the entire holding period.

In an apparatus such as the spray vat pasteurizer described, the heating water, as before explained, flows over and then out of contact with the conducting walls of the milk receptacle. Therefore, when the pump is stopped no heated water, or practically none, will be left in contact with said wall or walls, and the heat exchange relation between the water and milk will be interrupted, with the result that the milk temperature will not creep up or increase above the maximum predetermined temperature desired, as happens in the so-called "water-jacketed" pasteurizers or apparatus in which a body of heated water remains in heat exchange relation to the milk after the latter has been heated to the desired temperature. While the control of this invention is peculiarly suited for use with pasteurizers of the spray vat or analogous types in which the heat exchange relation between the heating medium and liquid being heated is interrupted when the desired temperature of the liquid is attained and to apparatus in which each individual vat has its individual circulating pump or means for the heating medium, nevertheless the control is not necessarily restricted in all respects to such applications.

I claim as my invention:

1. The combination of a vat containing a liquid, means for circulating a liquid heating medium in heat exchange relation to said liquid for heating the latter, thermo-sensitive means which regulates the temperature of the heating medium, and thermo-sensitive means which stops the circulation of the heating medium when the liquid is heated to a predetermined temperature, the stopping of the circulation of the heating medium acting indirectly through said first mentioned thermo-sensitive means to shut off the source of heat for the heating medium.

2. The combination of a vat containing a liquid, means for circulating a substantially constant volume of a liquid heating medium in heat exchange relation to said liquid for heating the latter, means for supplying heat to said heating medium, means responsive to temperature changes in the liquid which stops the circulating means for and the circulation of the heating medium when the liquid is heated to a predetermined temperature, and means responsive to temperature changes in the heating medium which regulate the temperature of the heating medium and which stops the supply of heat to the heating medium when the circulation of the heating medium stops.

3. The combination of a vat containing a liquid, a pump which circulates a substantially constant volume of a liquid heating medium in heat exchange relation to said liquid for heating the latter, means for supplying steam under regulation for heating said heating medium, means responsive to temperature changes in the liquid which stops said pump and the circulation of the heating medium when the liquid is heated to a predetermined temperature, and means which are automatically operated to shut off the steam by the stopping of the circulation of the heating medium.

4. The combination of a vat containing a liquid, a pump which circulates a substantially constant volume of a liquid heating medium in heat exchange relation to said liquid for heating the latter, regulating means controlled by the temperature of the heating medium which automatically controls said temperature to heat the liquid to a predetermined temperature, and means responsive to temperature changes in the liquid which stops said pump and the circulation of the heating medium when the liquid is heated to a predetermined temperature, and thereafter operates to start and stop the pump in response to fluctuations in the temperature of the liquid from said predetermined temperature.

5. The combination of a vat containing a liquid, a pump and connections for circulating a substantially constant volume of a heating medium and causing it to flow in contact with the outer surface of the vat for heating the liquid in the vat, a steam supply for the heating medium, means controlled by the temperature in the circulating connections for the heating medium for regulating the supply of steam to the heating medium to produce a predetermined temperature of the liquid in the vat and for shutting off the steam when the liquid reaches said predetermined temperature, and means controlled by the temperature of said liquid which stops said pump when the liquid is heated to the predetermined temperature.

6. The combination of a container for a liquid, means including a pump and a circulating system for circulating a heating medium and causing it to flow in heat exchange relation to the liquid in the container for heating the liquid and then pass out of heat exchange relation to the liquid, means for supplying heat to the heating medium, means controlled by the temperature of the liquid in the container which stops the pump and the circulation of the heating medium when the liquid in the container is heated to a predetermined temperature, and means controlled by the temperature in said circulating system which regulate the temperature of the heating medium and stop the supply of heat thereto when said liquid is heated to said predetermined temperature.

7. The combination of a vat containing a liquid, means for causing a heating medium to flow in substantially constant volume in contact with a wall of the vat for heating the liquid therein and then pass out of contact with said wall, said means being such that the heating medium is in contact with said wall only while the heating medium is flowing, means controlled by the temperature of the heating medium for regulating the temperature thereof and limiting the maximum temperature of the heating medium, and means controlled by the temperature of said liquid which stops the flow of heating medium and thereby prevents its contact with said wall and effects the shutting off of the supply of heat to the heating medium when the liquid in the vat is heated to a predetermined temperature.

8. The combination of a container for a liquid, means for circulating a heating medium in heat exchange relation to said liquid for heating it, steam supply means for the heating medium, means controlled by the temperature of said liquid which stops the circulation of the heating medium when the latter is heated to a predetermined temperature, and control means responsive to temperature changes in the circulating heating medium which regulates the temperature of the latter and operates in response to the steam temperature to shut off the steam when the circulation of the heating medium is arrested.

9. The combination of a container for a liquid, means for circulating a heating medium in heat exchange relation to said liquid for heating it and then pass out of heat exchange relation to the liquid, said means being such that the heating medium is in heat exchange relation to said liquid only while the heating medium is flowing, steam supply means for the heating medium, means controlled by the temperature of said liquid which stops the circulation of the heating medium and thereby prevents its said heat exchange relation to said liquid when the latter is heated to a predetermined temperature, and control means responsive to temperature changes in the circulating heating medium which operates in response to the steam temperature to shut off the steam when the circulation of the heating medium is arrested.

10. The combination of a container for a liquid, means for circulating a heating medium in heat exchange relation to said liquid for heating it, steam supply means for the heating medium, control means responsive to temperature changes in the circulating heating medium for regulating the supply of steam to the heating medium, means controlled by the temperature of said liquid which stops the circulating means for and the circulation of the heating medium when the liquid is heated to a predetermined temperature, said first mentioned control means being affected by the steam temperature and operating to shut off the steam when the circulation of the heating medium is arrested.

11. The combination of a container for a liquid, means for circulating a heating medium in heat exchange relation to said liquid for heating it, said means being such that the heating medium is in heat exchange relation to said liquid only while the heating medium is flowing, steam supply means for the heating medium, control means responsive to temperature changes in the circulating heating medium for regulating the supply of steam to the heating medium, means including a device controlled by the temperature of said liquid which stops the circulating means for and the circulation of the heating medium when the liquid is heated to a predetermined temperature and also interrupts said heat exchange relation, said first mentioned control means being affected by the steam temperature and operating to shut off the steam when the circulation of the heating medium is arrested.

12. The combination of a container for a liquid, means for circulating a heating medium in heat exchange relation to said liquid for heating it, steam supply means for the heating medium, means controlled by the temperature of said liquid which stops the circulation of the heating medium when the liquid is heated to a predetermined temperature, and control means responsive to temperature changes in the circulating heating medium which operates in response to the steam temperature to shut off the steam when the circulation of the heating medium is arrested and operates in response to the temperature of the heating medium to turn on the steam when the circulation of the heating medium is again resumed.

13. The combination of a container for a liquid, means including a circulating system for circulating a heating medium in heat exchange relation to said liquid for heating the latter, means for supplying heat to said heating medium, means controlled by the temperature of the liquid which stops the circulating means for and the circulation of the heating medium when said liquid is heated to a predetermined temperature, and means controlled by the temperature in the circulating system of the heating medium which regulates the temperature of the heating medium and which stops the supply of heat to the heating medium when the circulation of the heating medium stops.

14. The combination of a container for a liquid, a pump which circulates a substantially constant volume of a liquid heating medium in heat exchange relation to said liquid for heating the latter, means for supplying steam for heating said heating medium, automatically controlled means which stops said pump and the circulation of said heating medium when said liquid is heated to a predetermined temperature, and automatically controlled means which regulates the temperature of the heating medium and shuts off the steam when the circulation of the heating medium stops.

15. The combination of a circulating system and means for circulating a liquid heating medium in heat exchange relation to a body of liquid for heating the latter, means for supplying steam to said heating medium, an element responsive to temperature changes in said liquid, an element responsive to temperature changes in said circulating system, and control devices controlled by said elements and automatically acting conjointly to regulate the supply of steam to heat said liquid to a predetermined temperature, shut off the steam and stop the circulation of the heating medium when said predetermined temperature is reached, and thereafter start and stop the circulation of the heating medium and turn on and shut off the steam responsive to fluctuations in the temperature of said liquid from said predetermined temperature.

16. The combination of a vat containing a liquid, a pump and circulating system for circulating a liquid heating medium and causing the same to flow in a surface film over and then out of contact with the outer surface of the vat for heating said liquid, steam supply means for the heating medium, an element responsive to temperature changes in said liquid, an element responsive to temperature changes in said circulating system, and control devices controlled by said elements and automatically acting conjointly to regulate the supply of steam to heat said liquid to a predetermined temperature and stop said pump and the circulation of the heating medium and shut off the steam when said predetermined temperature of said liquid is reached.

17. The combination of a container for a liquid, circulating means for causing a heating medium to flow in heat exchange relation with said liquid for heating it and then pass out of such heat exchange relation, said means being such that the heating medium is in heat exchange relation with said liquid only while the heating medium is flowing, means for supplying heat to said heating medium, means controlled by the temperature of said liquid which stops the flow of said heating medium and thereby interrupts said heat exchange relation when said liquid is heated to a predetermined temperature, and means which regulates the temperature of said heating medium for heating said liquid to said predetermined temperature and shuts off the supply of heat to the heating medium when said liquid is heated to said predetermined temperature.

18. The combination of a container for a liquid, circulating means for causing a heating medium to flow in contact with and then off of a heat exchange wall of the container for heating said liquid, said means being such that the heating medium is in contact with said wall and in heat exchange relation to said liquid only while the heating medium is flowing, means controlled by the temperature of said liquid which stops the circulating means for and the flow of said heating medium, and thereby interrupts said heat exchange relation when said liquid is heated to a predetermined temperature, and automatic means which regulates the temperature of said heating medium for heating said liquid to said predetermined temperature.

19. The combination of a container for a liquid, means for circulating a heating medium in heat exchange relation to said liquid for heating the latter, means for supplying heat to said heating medium, automatically controlled means which stops the circulation of said heating medium when said liquid is heated to a predetermined temperature and thereafter starts and stops circulation of the heating medium in response to fluctuations in the temperature of said liquid from said predetermined temperature, and automatically controlled means which regulates the temperature of the heating medium and shuts off and turns on the supply of heat to the heating medium when the circulation of the heating medium is respectively stopped and started.

HAROLD S. FIELDER.